United States Patent

[11] 3,568,046

[72] Inventor Edward Watson
Hayling Island, England
[21] Appl. No. 805,492
[22] Filed Mar. 10, 1969
Continuation-in-part of application Ser. No. 485,034, Sept. 3, 1965.
[45] Patented Mar. 2, 1971
[73] Assignee Newport Instruments Limited
Newport Pagnell, Buckinghamshire, England
[32] Priority Mar. 11, 1968
[33] Great Britain
[31] 11806

[54] APPARATUS FOR EXAMINATION AND MEASUREMENT BY MEANS OF NUCLEAR MAGNETIC RESONANCE PHENOMENA
1 Claim, 9 Drawing Figs.
[52] U.S. Cl...................................................... 324/0.5
[51] Int. Cl........................................................ G01n 27/78
[50] Field of Search... ................................ 324/0.5, Lit

[56] References Cited
UNITED STATES PATENTS
| | | | |
|---|---|---|---|
| 2,888,638 | 5/1959 | Nelson | 324/0.5 |
| 2,999,974 | 9/1961 | Pinkley | 324/0.5 |
| 3,099,793 | 7/1963 | Pinkley | 324/0.5 |
| 3,297,860 | 1/1967 | Weiss | 324/0.5 |
| 3,394,300 | 7/1968 | Packard | 324/0.5 |

Primary Examiner—Michael J. Lynch
Attorney—Young and Thompson

ABSTRACT: A signal including a plurality of successive and amplified nuclear magnetic resonance pulses obtained from a sample is gated to a display instrument only during separated short intervals of time which each embrace the period of occurrence of one of said pulses. Integration of a succession of detected pulses is effected under the control of a timing circuit.

INVENTOR
EDWARD WATSON

APPARATUS FOR EXAMINATION AND MEASUREMENT BY MEANS OF NUCLEAR MAGNETIC RESONANCE PHENOMENA

This application is a continuation-in-part of my copending application Ser. No. 774,588, filed Nov. 5, 1968, which in turn was a continuation of my then copending but now abandoned U.S. application Ser. No. 485,034, filed Sept. 3, 1965. The invention relates to the use of the nuclear magnetic resonance phenomenon in the examination and measurement of the condition or properties of materials and has particular, although by no means exclusive, application to industrial use for the examination of, for instance, their moisture content. One particular application, quoted by way of example, is in the curing and storage of tobacco leaf. Other analogous applications are in the paper making, sugar, dried food, confectionery and flour milling industries and also with relation to pulverized coal and soil mechanics for civil engineering purposes.

The use of the nuclear magnetic resonance NMR phenomenon for examination purposes is now well known and established and has been described in technical literature such as, for instance, "Nuclear Magnetic Reasonance" by E. B. Andrew. Broadly, a specimen of the material concerned is immersed in a first unidirectional and homogenous magnetic field and in a second alternating magnetic field disposed to lie at right angles to such first field. At a particular alternation frequency of the alternating field which is related to the strength of the unidirectional field, power is absorbed from the alternating field and from this power absorption there may be readily derived an electrical signal which is indicative of the condition of resonance.

In most practical NMR circuit arrangements provision is made for the periodic variation with time or scanning of either the alternation frequency of the alternating magnetic field or, more usually, the field strength of the unidirectional field in order to embrace the respective resonance conditions for a number of different materials and thereby to allow determination of the identity or character of the particular material sample under examination; when this is done the progressive increase of absorption followed by the similar progressive decrease of absorption as the aforesaid scanning variation sweeps through the particular resonance condition for the material sample results in the production of a resonance indicating output signal having the form of a bell-shaped pulse waveform.

It has already been established that, for any given apparatus, the area under such pulse is directly proportional to the number of nuclei involved in the resonance and measurement of such area can provide a considerable amount of useful information about the material. Thus in the above quoted example of tobacco leaf, if moisture is present in the leaf the hydrogen nuclei of such moisture can result in a resonance under certain conditions which is related to the amount of moisture present. The aforesaid area under the pulselike resonance curve can be related to the physical condition of the leaf and hence to the likelihood or otherwise of spoilage when stored.

Unfortunately the derived signal is extremely small and rarely exceeds more than a few microvolts when referred to the coil winding which surrounds the material sample and which carries the alternating current for producing the alternating field. This necessitates the use of a large measure of amplification by electronic means in order to produce a signal of sufficient amplitude to operate display means such as an indicating meter or a cathode ray oscilloscope or recording means such as a pen or other recorder and the extent of amplification necessary is such that the actual noise component of the amplified signal waveform becomes significant and it is very difficult to provide arrangements whose gain is stable enough to allow a calibration which will remain accurate for more than a few minutes.

My aforesaid patent application Ser. No. 485,034 describes in detail a system in which two samples are used, the one forming a reference against which the other is measured. In addition, there is included therein details of an alternative system in which only one sample is used, this sample being tested repeatedly and the output signal being selectively gated.

In respect of this latter single-sample system the aforesaid application discloses the use of apparatus compressing nuclear magnetic resonance detecting means having a sensing coil winding arranged to surround the sample and provide a succession of resonance pulse signals, said sensing coil winding being located within a unidirectional magnetic field at right angles to the axis of an alternating field due to the sensing coil winding, amplifier means connected to continuously receive all of the output signals from said detecting means and to provide common amplification for all said pulse signals, metering means connected to the output of said amplifier means to permit the transmission to said metering means of only those portions of the output which embrace the time period of occurrence of each of said pulse signals and to maintain the input signal to said metering means at all other times at a constant level.

The present invention is particularly concerned with improvements and modifications to a single-sample system of this latter type.

In accordance with the present invention there is provided, in combination with the single-sample apparatus of the type described above, integrating means operative to integrate the output of said switching means over a plurality of resonance indications from the sample, and timing means arranged to generate command signals for controlling the integration time of said integrating means and for triggering an associated display instrument.

The integration of the resonance signals in this way for a selected number of passages through the resonance condition results in a more precise indication, and is far more efficient than measurement of a single passage through resonance, particularly in the extraction of the desired information from a signal which includes considerable background noise.

In order that the nature of the invention may be more readily understood, embodiments thereof will now be described by way of illustrative example and with reference to the accompanying drawings, in which.

Figure 1:
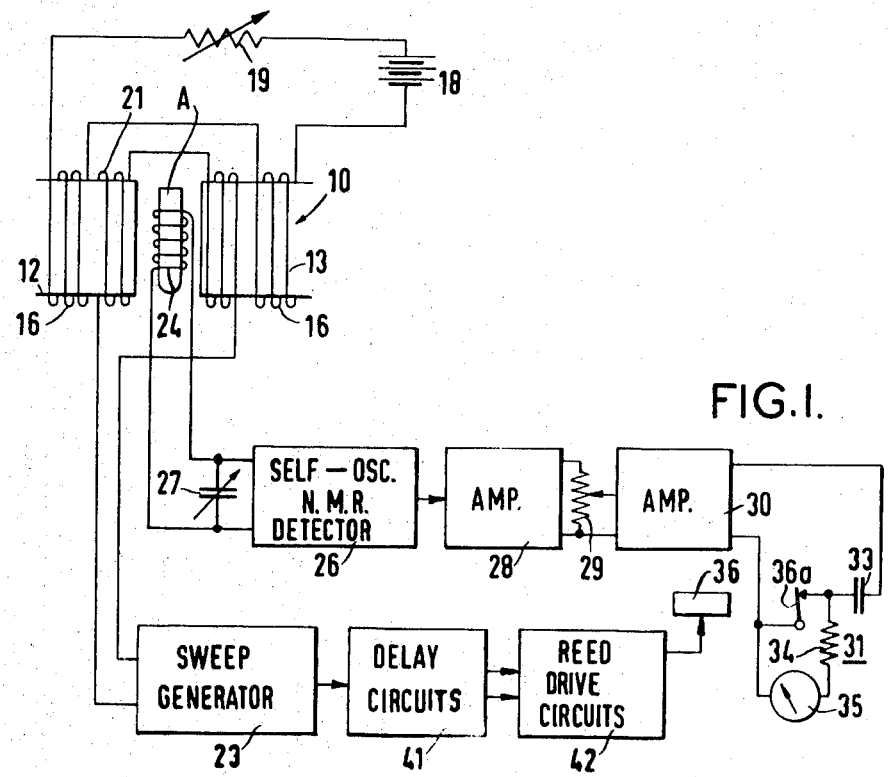
FIG. 1 is a block schematic diagram of a single-sample system in accordance with the invention.
Figure 4:
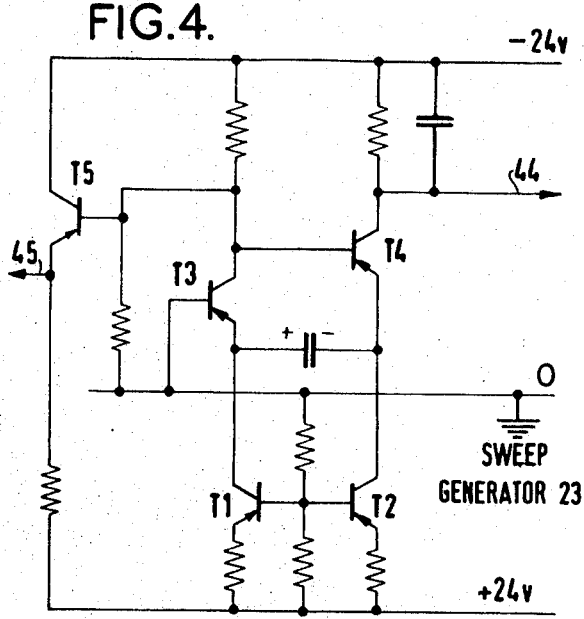
Figure 2:
FIG. 2 is a waveform diagram illustrating the general form of the bell-shaped output pulse which results from the setting up of nuclear resonance conditions within a material sample during the operation of the arrangement as shown in FIG. 1.
Figure 3:
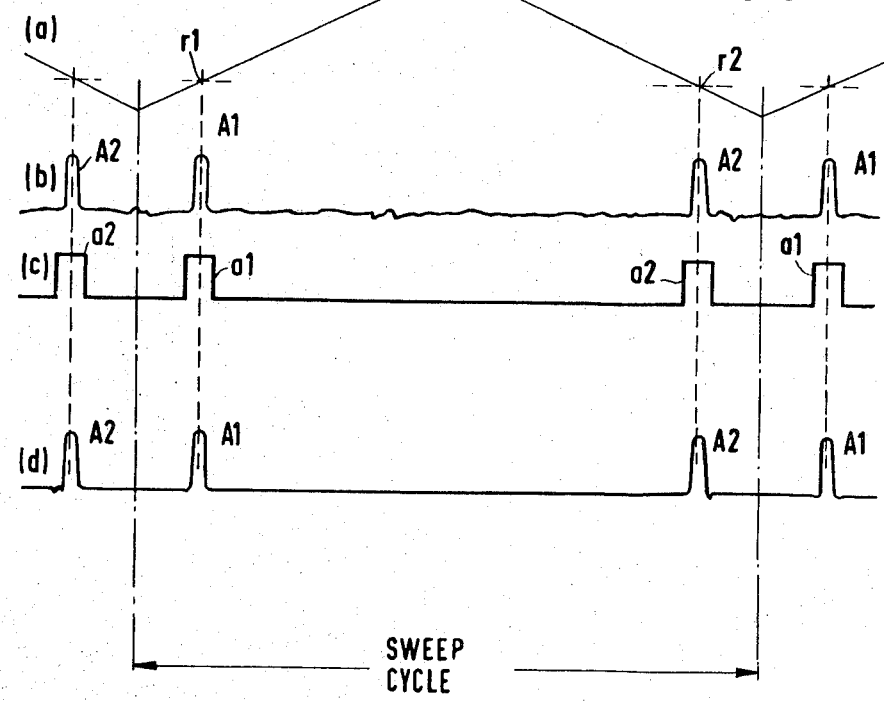
Figure 5:
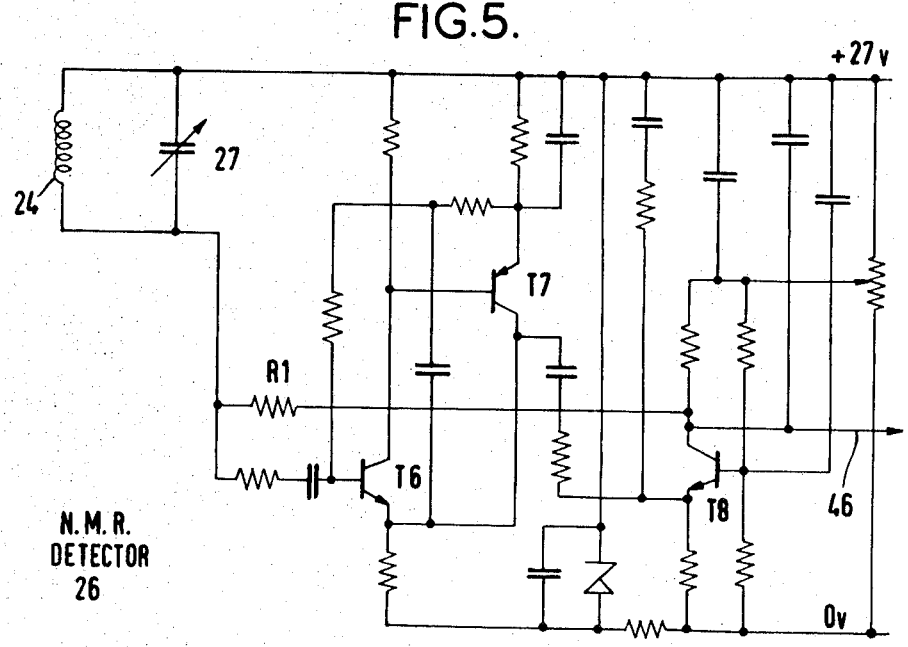
Figure 6:
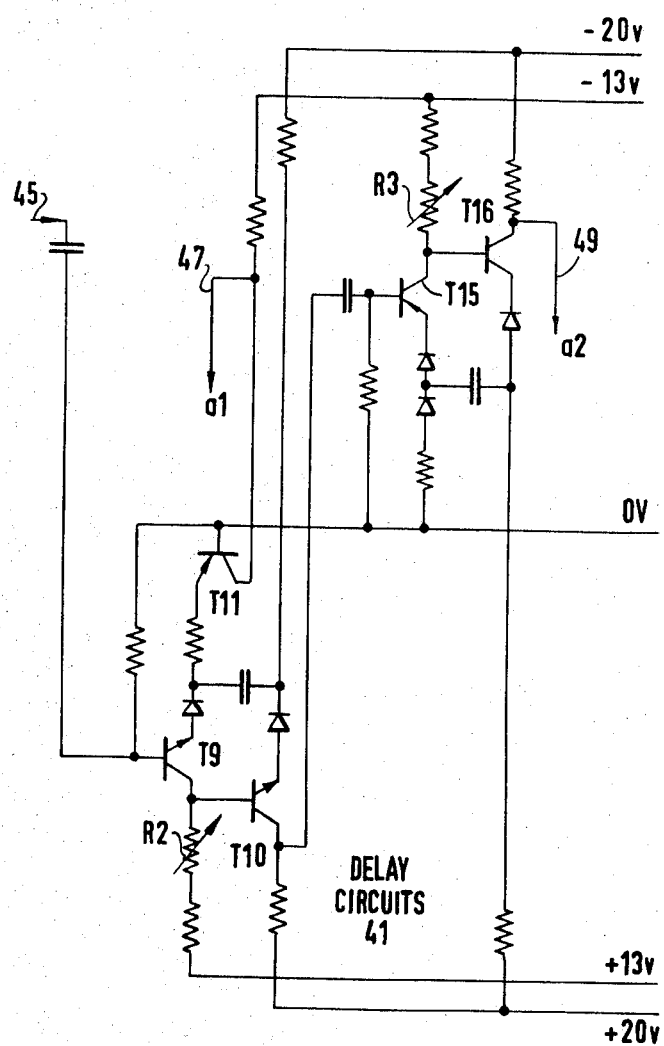
Figure 7:
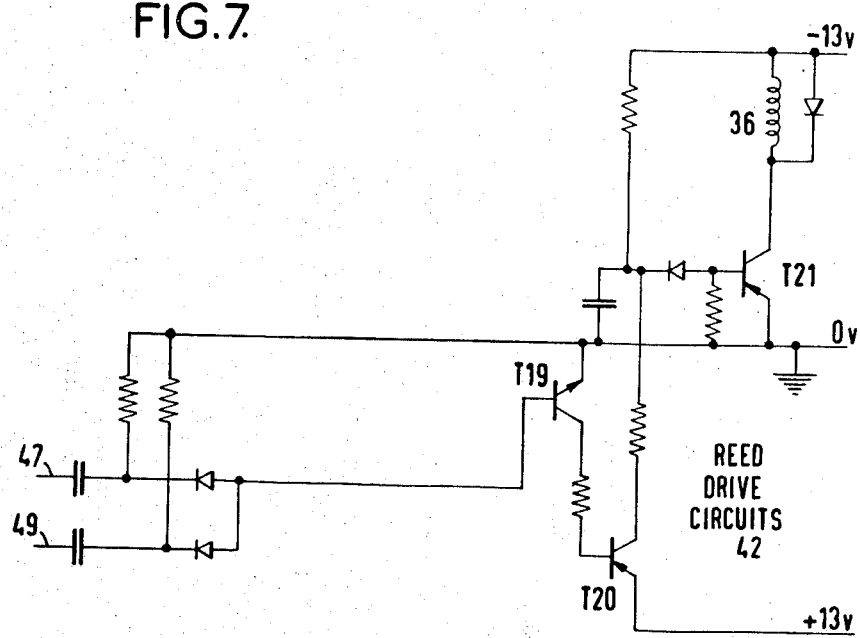
Figure 8:
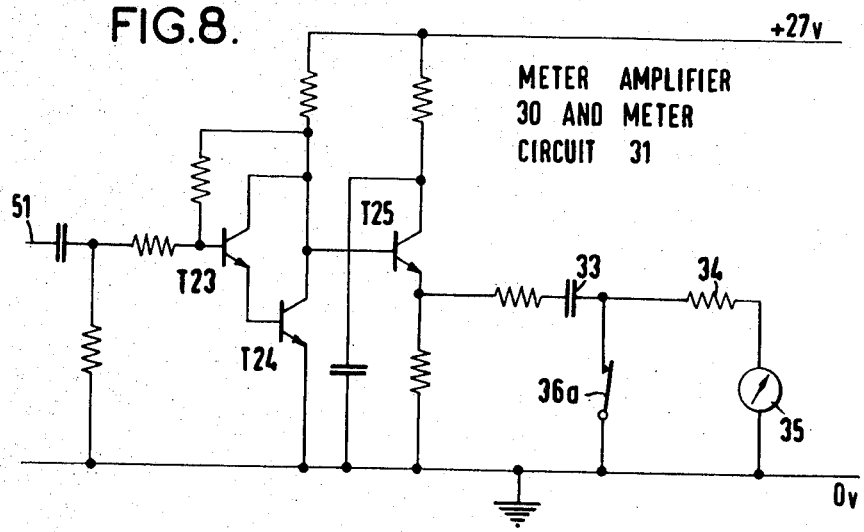
Figure 9:
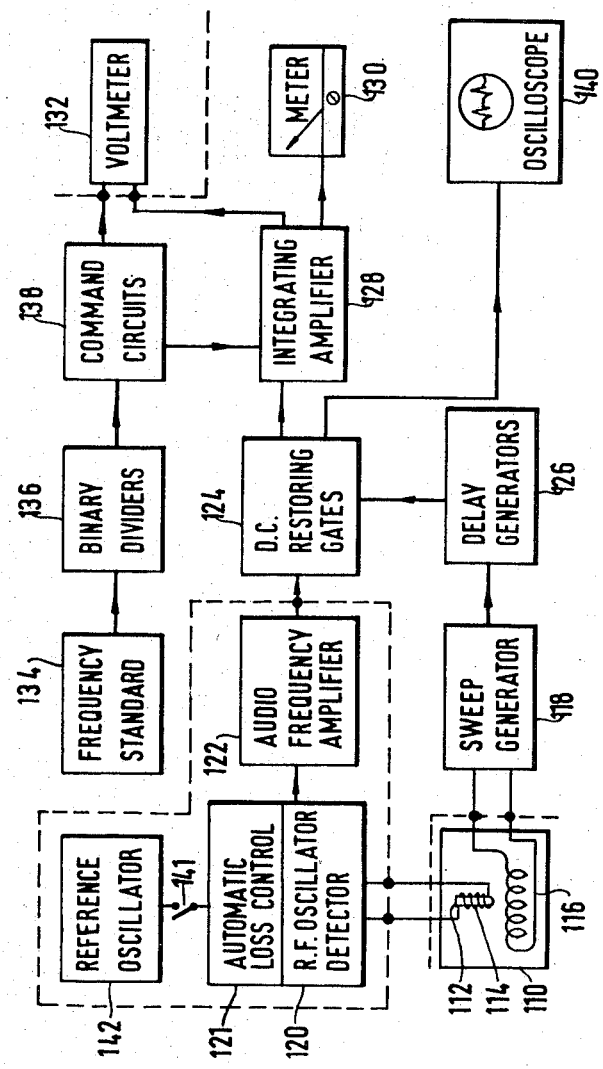

FIG. 3 comprises a series of representative waveform diagrams (a)—(d) applicable to the operation of the apparatus arrangement shown in FIG. 1;

FIG. 4 is a circuit diagram illustrating one form of the sweep generator portion of the arrangement shown in FIG. 1;

FIG. 5 is a circuit diagram illustrating one form of the nuclear magnetic resonance detector of the arrangement shown in FIG. 1;

FIG. 6 is a circuit diagram illustrating one form of the delay circuit device of the arrangement shown in FIG. 1;

FIG. 7 is a circuit diagram illustrating one form of the relay or reed drive portion of the arrangement shown in FIG. 1;

FIG. 8 is a circuit diagram illustrating the detailed form of the meter amplifier and meter circuit of the arrangement shown in FIG. 1;

FIG. 9 is a block schematic diagram of a preferred single-sample system in accordance with the invention.

The arrangement shown in block schematic form in FIG. 1 comprises a magnet structure 10 illustrated only by its opposing pole pieces 12,13 for providing a homogeneous unidirectional magnetic field within which is immersed a material sample A. The pole pieces 12,13 are surrounded by magnet windings 16 for energization by a suitable direct current source, shown symbolically as a battery 18. A variable series resistor 19 in the supply leads to the winding 16 permits adjustments of the field intensity provided by the winding.

The pole pieces 12,13 are additionally embraced by scan coil windings 21. The winding 21 is connected in series for supply with a cyclically varying current, such as one having a sinusoidal or a triangular waveform, from a sweep generator 23 for cyclically varying the intensity of the unidirectional field to which the sample A is subjected.

A further coiled winding 24 surrounds the sample A and is connected to a self-oscillating nuclear magnetic resonance detector 26 whereby it is supplied with a high frequency oscillation in order to provide the high frequency magnetic field lying at right angles to the unidirectional magnetic field necessary for the establishment of nuclear magnetic resonance within the material sample A. Winding 24 forms part of the resonant tank circuit of the detector 26 while the parallel variable capacitor 27 allows adjustment of the oscillation frequency.

The derived resonance signals at the output of the detector 26 are fed to a first amplifier 28 having a high gain value and a proportion of the amplifier output, adjustable by means of potentiometer 29, is applied to a further meter amplifier 30. The output of the latter is fed to a motor circuit 31. The meter circuit 31 includes a feed capacitor 33 in series with a resistor 34 and indicating meter 35, the resistor 34 and meter 35 being shunted by normally closed contacts 36a of a relay device whose operating coil is indicated at 36.

In addition to supplying the cyclically varying current to the scan coil 21, the sweep generator 23 supplies a corresponding cyclically varying voltage waveform to a multiple delay circuit 41 which provides two separate pulse form output signals following the commencement of each sweep cycle of the output waveform from the generator 23. The respective delay period for each of these pulses is independently adjustable. These pulse signals are fed to a reed drive circuit 42 to cause energization of the relay coil 36 twice during each cycle period of the sweep waveform.

In the operation of the arrangement just described, the cyclically varying current from the sweep generator 23 to the scan coil 21, having a triangular waveform as shown in FIG. 3(a), causes the otherwise steady value of the unidirectional field caused by energization of the winding 16 to be increased and decreased regularly, once in each cycle period of the sweep waveform.

In the well-known manner, at particular values of the unidirectional field related to the operating frequency of the high frequency oscillation supplied by the NMR detector circuit 26 to the coil winding 24, nuclear resonances occur within the material sample A.

Each resonance results in an output signal from the detector 26 having the general form shown in FIG. 1. As already stated the area, shown hatched, under the pulse envelope line is directly proportional to the number of nuclei involved in the resonance and is the factor which requires to be measured. The signal waveform of the output from the detector 26 is accordingly, after amplification in amplifiers 28 and 30, as shown in FIG. 3(b) where the pulse signals A1 and A2 result from resonance within the material sample A. With the large amount of amplification needed the zero or base line of the signal may carry quite a large noise component.

During each sweep cycle of the sweep generator 23, the variable delay circuits 41 and the reed drive circuits 42 operate to provide a pair of pulses as shown at a1 and a2 in FIG. 3(c) adjusted to be coincident in timing with the signal pulses A1, A2. Such pulses are used to separate or gate out the A sample signals to the meter circuit in a manner which also restores the respective signal outputs to a zero or earth level and which effectively reduces the active noise component to that which occurs during the gated-out pulse periods only.

This result is achieved by the energization of the reed or relay coil 36, FIG. 1 by the pulses a1, a2, FIG. 3(c) whereby the contacts 36a, FIG. 1 are opened only during the time of such pulses and accordingly pass only the coincident signal pulses A1, A2 with that very small portion of the accompanying signal noise which occurs within the time of each control pulse to the meter 35.

One form of the sweep generator 23 is shown in FIG. 4 and comprises transistors T1, T2, T3, T4 arranged to form a sawtooth relaxation oscillator. Output lead 44 supplies an associated power amplifier of any convenient and well-known form for deriving a current waveform as shown in FIG. 3(a) while transistor T5 provides a similar control voltage waveform over lead 45 to the delay circuits 41 as shown in detail in FIG. 6.

The NMR detector circuit 26 may be of any convenient and known form such as that due to Hopkins as described in the reference already quoted. One convenient form is shown in FIG. 5 where transistors T6, T7 are arranged as a unity-gain amplifier feeding a limiter including transistor T8 with positive feedback to maintain oscillation by way of resistor R1. The signal output on lead 46 is fed to the high gain amplifier 28 which may have any suitable known form.

The delay circuits 41 and the associated relay control pulse generating means of the drive circuits 42, FIG. 1, may take any suitable form such as a group of monostable trigger circuits including delayed triggering arrangements for providing the requisite short pulses at adjustable timing instants following the onset of each cycle period of the sweep waveform. An alternative and preferred circuit arrangement for the delay circuits 41 is shown in FIG. 6 where transistors T9, T10, T11 and their associated circuit components form a pulse generator providing an output pulse a1 on lead 47 after a delay time from the onset of the triangular wave input on lead 45 determined by the adjusted value of resistor R2. Further transistors T15, T16 form a further pulse generator controlled by the first circuit of transistors T9, T10, T11 to provide in output pulse a2 on lead 49 after a further delay time set by means of variable resistor R3.

Such pulses on leads 47 and 49 are fed to the drive circuits shown in FIG. 7 where transistors T19, T20 T21 develop from the pulses a1, a2, the requisite operating currents for the coil winding of the reed relay 36.

FIG. 8 illustrates the meter amplifier 30 as including transistors T23, T24 and T25 arranged as a direct current amplifier of the output signals from the amplifier 28 and control potentiometer 29, FIG. 1, over lead 51 and supplying the meter circuit as already dealt with.

Referring now to FIG. 9 of the drawings, there is provided a magnet assembly 110 which produces a large volume of homogeneous magnetic field. This magnetic assembly may comprise permanent magnets or electromagnets and may be for example of the form described in my U.S. Pat. application Ser. No. 499,243 filed Apr. 19, 1965, or as described in U.S. Pat. application Ser. No. 712,631 filed March 13, 1968, in the names of myself and D. W. Parker, A sample 112 is mounted within the magnet assembly 110 and an RF coil 114 is wound around the sample and is positioned in the center of the magnet assembly. The pole pieces of the magnet are surrounded by windings (not shown) for providing a unidirectional magnetic field for the sample 112. The pole pieces are additionally provided with modulation coils 116 energized from a sweep generator 118. The modulation coils 116 are supplied with a cyclically varying current, for example, a 30 Hz. triangular current waveform, for cyclically varying the unidirectional field on each side of its normal value. The coil 114 when energized provides a homogeneous RF field so that the sample is thereby subjected to a high frequency magnetic field at right angles to the unidirectional magnetic field. The RF coil 114 forms part of the resonant tank circuit of an RF oscillator detector 120. The proton resonance of the sample 112 is excited each time the field is swept through the gyromagnetic value corresponding to the frequency of the RF oscillations of the RF oscillator detector 120 connected to the coil 114. By the correct adjustment of the RF oscillator frequency two resonance peaks are produced in each sweep cycle, as described in detail above.

The energy absorbed from the RF coil 114 by these resonances produces a characteristic modulation of the RF envelope. This modulation is detected in the oscillator detector 120 and is amplified in a stablegain AC coupled audio frequency amplifier 122. Provided that the RF energy level is not sufficient to saturate the sample the energy energy absorption is proportional to the total number of protons in the sample 112 contributing to the resonance. For any given proton-containing material the number of protons is proportional to the total weight. The resonance due to protons in unbound molecules, i.e., those present in the liquid state, has a much narrower bandwidth than that due to protons in molecules which are bound in the solid state. The apparatus here described is designed to detect only the energy loss due to the unbound molecules. This is done by means of DC restoring gates indicated generally at 124 and which are fully described in respect of the embodiment of FIG. 1 where the DC restoring gates are constituted by the delay circuits 41, the reed drive circuits 42, and the relay 36. These DC restoring gates 124 are controlled from the sweep generator 118 via delay generators 126 which correspond to the delay circuits 41 of FIG. 1, and in consequence the gates are opened only long enough to permit the passage of the narrow-band liquid resonances. This effectively eliminates problems of noise in the amplified detected signals. The energy loss is then proportional to the area under the train of resonance pulses after their passage through the gates 124. In other words, the apparatus incorporates a DC restoration circuit which clamps the signal baseline to earth so that the resonance signals alone are amplified in the amplifier 122, and thereafter these amplified DC signals are gated to indicating and/or recording instruments by a synchronous reed switch in the gates 124. The average DC component of the resulting output is then the mean area under the absorption pulses and a quantitative reading can be obtained independent of the shape of the baseline.

When setting up the instrument, the resonance pulses are fed to an operational amplifier 128 which is connected as a current amplifier. The DC output of the amplifier 128 is smoothed by suitable circuitry and is indicated continuously on a meter 130. This output current is proportional to the number of protons in the liquid portion of the sample 112.

For greater accuracy, the resonance pulses are fed to the amplifier 128 connected as an integrating amplifier. The amplifier 128 is allowed to integrate for a fixed period of time and its output is indicated on an external voltmeter 132. The amplifier 128 may be controlled to integrate for a preselected number of passages through resonance, for example, for 1024, 2048, 4096 or 8192 resonances. Associated with the amplifier 128 and the voltmeter 132 is a timing system comprising a frequency standard 134, a binary divider circuit 136, and command circuits 138. For convenience of use with a digital voltmeter 132 a "read" command signal is generated by the command circuits 138 at the end of the integration period to trigger the voltmeter display. The command circuits 138 can be set for "single-shot" or "continuous" modes of operation. In the latter mode the instrument automatically remeasures the sample, first discharging the integrating amplifier capacitor and then using the same integration period. The voltmeter reading therefore changes if there is any difference between successive readings. In the "single-shot" mode the output is held at a final value at the end of the integration period. The system can also be adapted for automatic printout.

The accuracy of the quantity analyzer is critically dependent on the stability of the RF level and on the correct setting on the resonance in the gates 124. The stability of the RF level is enhanced by using a low-noise oscillator circuit 120 incorporating a level meter. In addition an automatic loss-control circuit 121 is provided which compensates for variations in dielectric or conductive losses which may occur in a series of samples of the same type of material.

In order to position the resonances correctly in the gates 124, i.e., to adjust the RF tuning, an oscilloscope 140 is provided. This adjustment of the RF tuning is preferably carried out as a preliminary test with a sample 112 containing a large quantity of liquid in order to make the resonances more easily visible on the oscilloscope 140. Analysis can subsequently be made of samples whose liquid content is so small that the resonances are no longer visible on the oscilloscope.

Due to the fact that conductive samples have the effect of detuning the free-running RF oscillator 120 and so shifting the resonances from the gates 124, a reference oscillator 142 is provided to ensure correct frequency setting with all samples. The reference oscillator 142 is connected to the RF oscillator 120 through a switch 141 and is adjusted to zero beat with the main oscillator 120 when this is correctly set using a sample providing a strong output signal. The auxiliary oscillator 142 can then be used as a reference for setting the main oscillator 120 when samples having weak output signals are under test.

In a preferred system, means are provided for accurately controlling the temperature of the sample 112 because the NMR signal is temperature dependent. Such temperature stability provides a correspondingly more accurate measurement. Moreover, the RF oscillator level should be as high as possible without saturation of the sample occuring. The optimum RF level for any particular sample material must be determined by experiment. A paramagnetic relaxing agent may be added to the sample in order to raise the saturation level. Further details of certain parts of the system shown only in schematic form in FIG. 9 may be found by reference to the description of the embodiment of FIG. 1 which utilizes corresponding components where appropriate.

I claim:

1. Apparatus for effecting examination and measurement of the condition or properties of a test material sample by the use of the nuclear magnetic resonance phenomenon which comprises nuclear magnetic resonance-detecting means including a sensing coil arranged to surround said test material sample, free running oscillator means to induce oscillation in said sensing coil to provide an alternating magnetic field, said free running oscillator means operating to provide an energy level which is maintained at a value slightly less than that necessary to cause saturation of said sample, a reference oscillator means coupled through switch means to said free running oscillator means, said reference oscillator means being adjustable for zero beat with said free running oscillator means to maintain the tuning thereof, unidirectional field producing means arranged to subject said test material sample to a homogeneous unidirectional magnetic field at right angles to the axis of the magnetic field generated by said sensing coil, scan means cyclically sweeping through the resonance condition whereby a succession of resonance pulse signals from said sample occur in the sensing coil, amplifier means connected to receive and amplify in like manner the resonance pulse signals from said sensing coil, variable delay means connected to receive a cyclically varying signal from said scan means and adjustable to operate upon receipt of said cyclically varying signal to provide a plurality of gate pulse signals coincident in timing and substantially equal in duration to the resonance pulse signals from said sensing coil, gating means connected for actuation by said gate pulse signals and operating upon receipt of a gate pulse signal to permit transmission of a coincident output pulse from said amplifier means, integrating means operative to integrate and store the pulses passed through said gating means over a determinable number of resonance indications from the sample, digital indicator means connected to the output of said integrating means, and timing means connected to control said integrating means and said digital indicator means, said timing means operating to generate command signals for controlling the integration time of said integrating means and for triggering said digital indicator means and including a frequency standard signal generator and trigger means connected to said generator and operative at preselected intervals to feed a trigger signal to said integrating and digital indicator means to effect readout of the signal stored in said integrating means to said digital indicator means.